United States Patent
Shinoda et al.

(10) Patent No.: US 7,848,206 B2
(45) Date of Patent: Dec. 7, 2010

(54) DIFFRACTIVE OPTICAL ELEMENT AND OPTICAL HEAD

(75) Inventors: Masahisa Shinoda, Tokyo (JP); Daisuke Matsubara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 412 days.

(21) Appl. No.: 12/084,112

(22) PCT Filed: Oct. 17, 2006

(86) PCT No.: PCT/JP2006/320632

§ 371 (c)(1),
(2), (4) Date: May 7, 2008

(87) PCT Pub. No.: WO2007/049481

PCT Pub. Date: May 3, 2007

(65) Prior Publication Data

US 2009/0097121 A1 Apr. 16, 2009

(30) Foreign Application Priority Data

Oct. 28, 2005 (JP) .............................. 2005-314132

(51) Int. Cl.
*G11B 7/00* (2006.01)
*G11B 7/135* (2006.01)
(52) U.S. Cl. ............................ 369/112.04; 369/112.07; 359/569
(58) Field of Classification Search ................. 359/569, 359/571; 369/112.04, 112.05, 112.06, 112.07
See application file for complete search history.

(56) References Cited

U.S. PATENT DOCUMENTS

| 6,707,608 | B1 * | 3/2004 | Arieli et al. ................. 359/569 |
| 2002/0047084 | A1 | 4/2002 | Hayashi et al. |
| 2005/0180295 | A1 * | 8/2005 | Mimori ................. 369/112.07 |
| 2005/0237900 | A1 | 10/2005 | Sano et al. |

FOREIGN PATENT DOCUMENTS

| JP | 2001-281432 A | 10/2001 |
| JP | 2002-190133 A | 7/2002 |
| JP | 2002-311219 A | 10/2002 |
| JP | 2003-185819 A | 7/2003 |
| JP | 2005-141848 A | 6/2005 |
| JP | 2006-73042 A | 3/2006 |
| JP | 2006-236477 A | 9/2006 |
| KR | 2004-99456 A | 11/2004 |

* cited by examiner

*Primary Examiner*—Alessandro Amari
(74) *Attorney, Agent, or Firm*—Birch, Stewart, Kolasch & BIrch, LLP

(57) ABSTRACT

A diffractive optical element whose two diffraction gratings diffract three different wavelength light beams is provided. The diffractive optical element includes a first diffraction grating and a second diffraction grating that is located opposite the first one, and is configured in such a way that, among three different wavelength incident light beams, the diffraction efficiency in one light beam diffracted on the first diffraction grating is a predetermined value or less, and the diffraction efficiencies in the other two different incident light beams diffracted on the second diffraction grating are predetermined values or less. This arrangement can achieve a diffractive optical element capable of diffracting the three different wavelength light beams in a simple configuration.

6 Claims, 8 Drawing Sheets

DIFFRACTIVE OPTICAL ELEMENT AND OPTICAL HEAD

FIELD OF THE INVENTION

The present invention relates to optical heads and diffractive optical elements for use in optical disc drives. More specifically, the present invention relates to optical heads and diffractive optical elements compatible with different optical discs according to a plurality of different standards.

BACKGROUND OF THE INVENTION

In an optical disc drive that is capable of optically recording or reading data using a semiconductor laser as a light source, a CD (compact disc) in which the semiconductor laser has its center wavelength of 780 nm and a DVD (digital versatile disc) in which the semiconductor laser has its center wavelength of 650 nm have been made practical. Furthermore, generally, compatibility between both kinds of the optical discs is attained so that a single optical disc drive can handle both optical discs.

In such compatible optical disc drives, there are mounted two types of semiconductor lasers, a laser that generates an output beam at a wavelength of 780 nm and an output beam at 650 nm, on an optical head by which data are recorded on or read from an optical disc.

A conventional optical head has a tracking correction function that correctly tracks a data track on the optical disc; furthermore, generally, in order to perform such tracking correction, the optical head is generally provided with a diffraction grating that disperses into three light beams a light beam from the semiconductor laser. For example, diffraction grating specifications have been designed to make implementable a tracking error detection method called three-beam method, well known in the CD, and a tracking error detection method called differential push-pull method, well known in the DVD. Thus, a dedicated diffraction grating is needed for each wavelength of the semiconductor lasers.

However, recent technological advances in semiconductor laser have made it practical to provide a semiconductor laser that enables laser beams of two different wavelengths to generate from a single semiconductor laser package, or a single semiconductor laser element. A problem has been that since these two different-wavelength laser beams travel along the same optical path, desired optical performance for the laser beam of each of the two wavelengths can not be achieved when a diffraction grating designed to satisfy optical performance in a conventional single wavelength is used.

There is disclosed an improvement for overcoming this problem: a diffractive optical element and an optical head that is provided thereon with a diffractive optical element in which only a first diffraction grating works for a first wavelength (e.g., 780 nm) and only a second grating for a second wavelength (e.g., 650 nm), by using a diffractive optical element integrally having two diffraction gratings (for example, refer to Patent Document 1).

In addition there is also disclosed a diffractive optical element and an optical head provided with the element in which a width ratio between diffraction grating ungrooved portions and grooved portions is optimized in order to adjust a dispersion rate of a laser beam on the respective gratings (for example, refer to Patent Document 2).

Patent Document 1

Japanese Unexamined Patent Publication 2002-190133 (pages 4 and 5, FIG. 1)

Patent Document 2

Japanese Unexamined Patent Publication 2002-311219 (pages 4 and 5, FIG. 2)

DISCLOSURE OF THE INVENTION

Problems that the Invention is to Solve

In recent years, however, there is a growing demand for greater recording density in the optical disc drive; an optical disc drive is being made practical that uses a blue light beam having a center wavelength of 405 nm as a third wavelength of the semiconductor laser. Further, similarly under development is a semiconductor laser that can generate a laser beam of three different wavelengths from a single semiconductor laser package. When the three different wavelength laser beams are generated from the single semiconductor laser package, these three wavelength laser beams travel along substantially the same optical path. Consequently, a problem is that in a conventional diffractive optical element working only for laser beams of two different wavelengths, desired optical performance for the laser beam of each of three wavelengths cannot be achieved.

The present invention is directed to overcome the forgoing problems, and an object of the invention is to provide a diffractive optical element that can achieve desired optical performance for the laser beam of each of three wavelengths. Another object of the invention is to provide an optical head that includes such diffractive optical element and is capable of recording data on and reading them from optical discs.

Means for Solving the Problem

A diffractive optical element according to the present invention comprises a first diffraction grating; and a second diffraction grating that is located opposite the first diffraction grating, wherein among three different wavelength incident light beams, a diffraction efficiency in one light beam diffracted on the first diffraction grating is a predetermined value or less, and diffraction efficiencies in the other two different wavelength light beams diffracted on the second diffraction grating are predetermined values or less.

ADVANTAGEOUS EFFECTS

In a diffractive optical element according to the present invention, two diffraction gratings enables laser beams of three different wavelengths to be diffracted.

Figure 1:
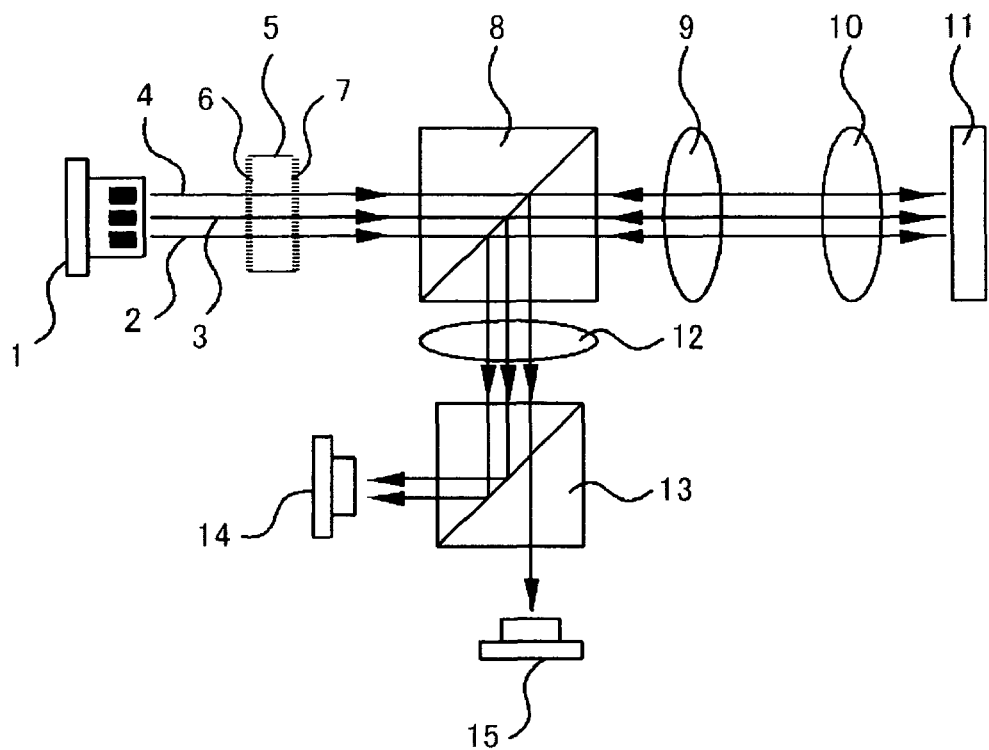
FIG. 1 is a schematic plan view illustrating a configuration of a diffractive optical element and an optical head according to Embodiment 1 of the present invention.

REFERENCE NUMERALS 1 semiconductor laser
2 first wavelength laser beam
3 second wavelength laser beam
4 third wavelength laser beam
5 diffractive optical element
6 first diffraction grating
7 second diffraction grating
8 beam splitter
9 collimator lens
10 objective lens
11 optical disc
12 lens
13 beam splitter
14 first optical detector
15 second optical detector
16 heat dissipation member
17 first semiconductor laser element
18 second semiconductor laser element
19 region generating a first wavelength laser beam
20 region generating a second wavelength laser beam
21 region generating a third wavelength laser beam

DESCRIPTION OF THE PREFERRED EMBODIMENTS

FIG. 1 is a schematic plan view illustrating a configuration of a diffractive optical element and an optical head according to Embodiment 1 of the present invention; referring to FIG. 1, a semiconductor laser 1 generates a light beam at each of three different wavelengths; a first wavelength laser beam is indicated at numeral 2; a second wavelength laser beam at numeral 3; and a third wavelength laser beam at numeral 4. A diffractive optical element, indicated at numeral 5, disperses a beam emitted from the semiconductor laser 1 into a transmissive beam and a diffracted beam; a first diffraction grating, at numeral 6, is formed on a first side where the emission beam from the semiconductor laser 1 enters; and a second diffraction grating, at numeral 7, is formed on a second side.

A beam splitter is indicated at numeral 8; a collimator lens, indicated at numeral 9, collimates the emission beam from the semiconductor laser 1; an objective lens, at numeral 10, focuses a laser beam passed through the collimator lens 9; an optical disc, at numeral 11, receives the laser beam focused through the objective lens 10; and a lens, at numeral 12, converges a reflected laser beam from the optical disc 11, reflected by the beam splitter 8. Another beam splitter is indicated at numeral 13; in the direction of a reflected beam is located a first optical detector 14; and in the transmissive direction is disposed a second optical detector 15.

Figure 2:
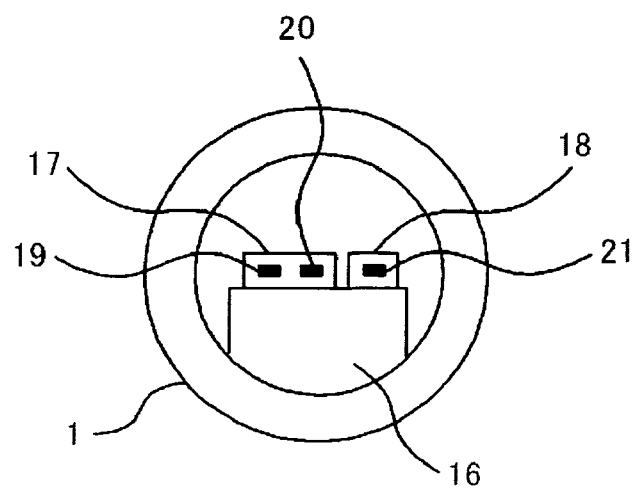
FIG. 2 is a schematic elevation view of a semiconductor laser 1 according to Embodiment 1 of the present invention, as viewed from the light emission direction.

FIG. 2 is a schematic elevation view, as viewed from the light emission direction; in the semiconductor laser 1 according to Embodiment 1 of the present invention; a heat dissipation member is indicated at numeral 16, on which first and second semiconductor laser elements 17 and 18 are disposed; the first semiconductor laser element 17 is, for example, an element that can generate two different wavelength laser beams; a region generating a first wavelength laser beam, indicated at 19, generates the first wavelength laser beam 2; a region generating a second wavelength laser beam, indicated at 20, generates the second wavelength laser beam 3; the second semiconductor laser element 18, having a region generating a third wavelength laser beam 21, generates the third wavelength laser beam 4.

Subsequently, the operation will be described. First, laser beams according to different kinds of optical discs are emitted from the semiconductor laser 1. Here, by way of example, let us assume that the first wavelength laser beam 2 has a wavelength of in the neighborhood of 780 nm, being used for CDs; that the second wavelength laser beam 3 has a wavelength of in the neighborhood of 650 nm, being used for DVDs; and that the third wavelength laser beam 4 has a wavelength of in the neighborhood of 405 nm, being used for blue ray discs.

The emitted laser beam passes in sequence through the diffractive optical element 5 and the beam splitter 8, then being collimated through the collimator lens 9, then forming a beam spot on the optical disc 11 through the objective lens 10, whereby data are recorded or read a laser beam reflected from the optical disc 11, passing in sequence through the objective lens 10 and the collimator lens 9, is reflected by the beam splitter 8 to enter the beam splitter 13 after passing through the lens 12.

The first wavelength laser beam 2 and second wavelength laser beam 3 are reflected by the beam splitter 13, with the first optical detector 14 receiving the reflected beams. In contrast, the third wavelength laser beam 4 passes through the beam splitter 13, with the second optical detector 15 receiving the beam. The first and second optical detectors 14 and 15 each detect signals needed for focus control and tracking control, as well as those read from the optical disc 11.

Figure 3:
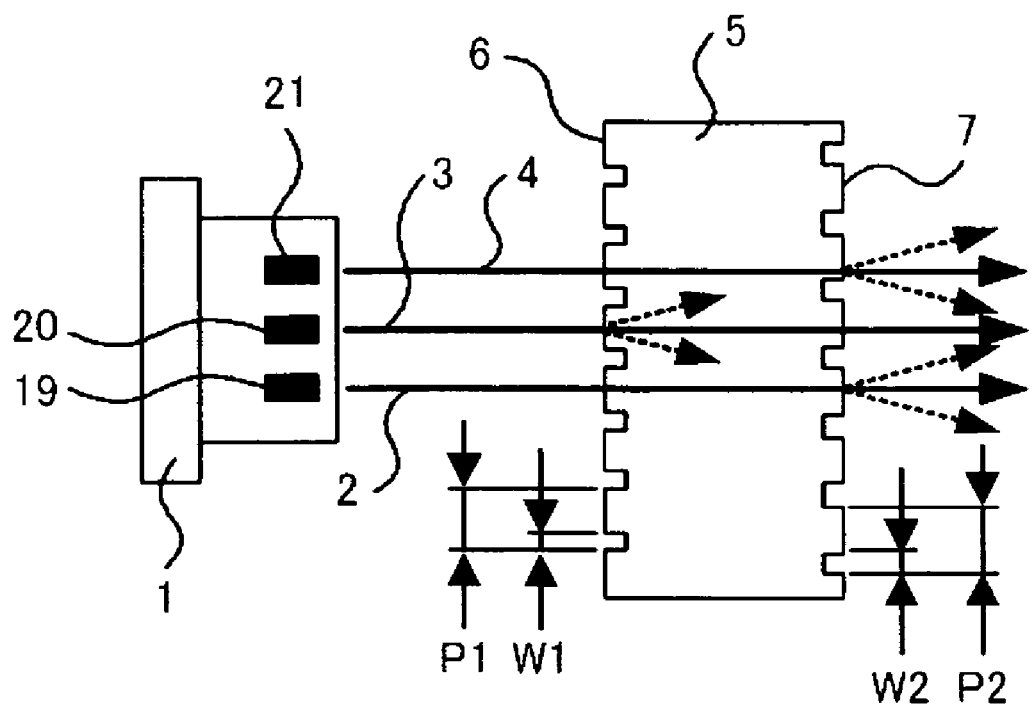
FIG. 3 is a schematic plan view illustrating a shape of the diffractive optical element and its operation, according to Embodiment 1 of the present invention.

Next, operation on the optical diffraction element 5, which is a main part according to the present invention, will be described. FIG. 3 is a schematic plan view illustrating a shape of the diffractive optical element and its operation; referring to FIG. 3, the first diffraction grating 6 of the diffractive optical element 5 has a grating pitch of P1, and the grooved portion width of W1. Similarly, the second diffraction grating 7 has a grating pitch of P2, and the grooved portion width of W2. Here, in the first and second diffraction gratings, duty cycles D1 and D2—the ratios between the grooved portion width and the pitch—are each defined as follows.

Equation 1

$$D1 = W1/P1 \tag{1}$$

Equation 2

$$D2 = W2/P2 \tag{2}$$

Figure 4:
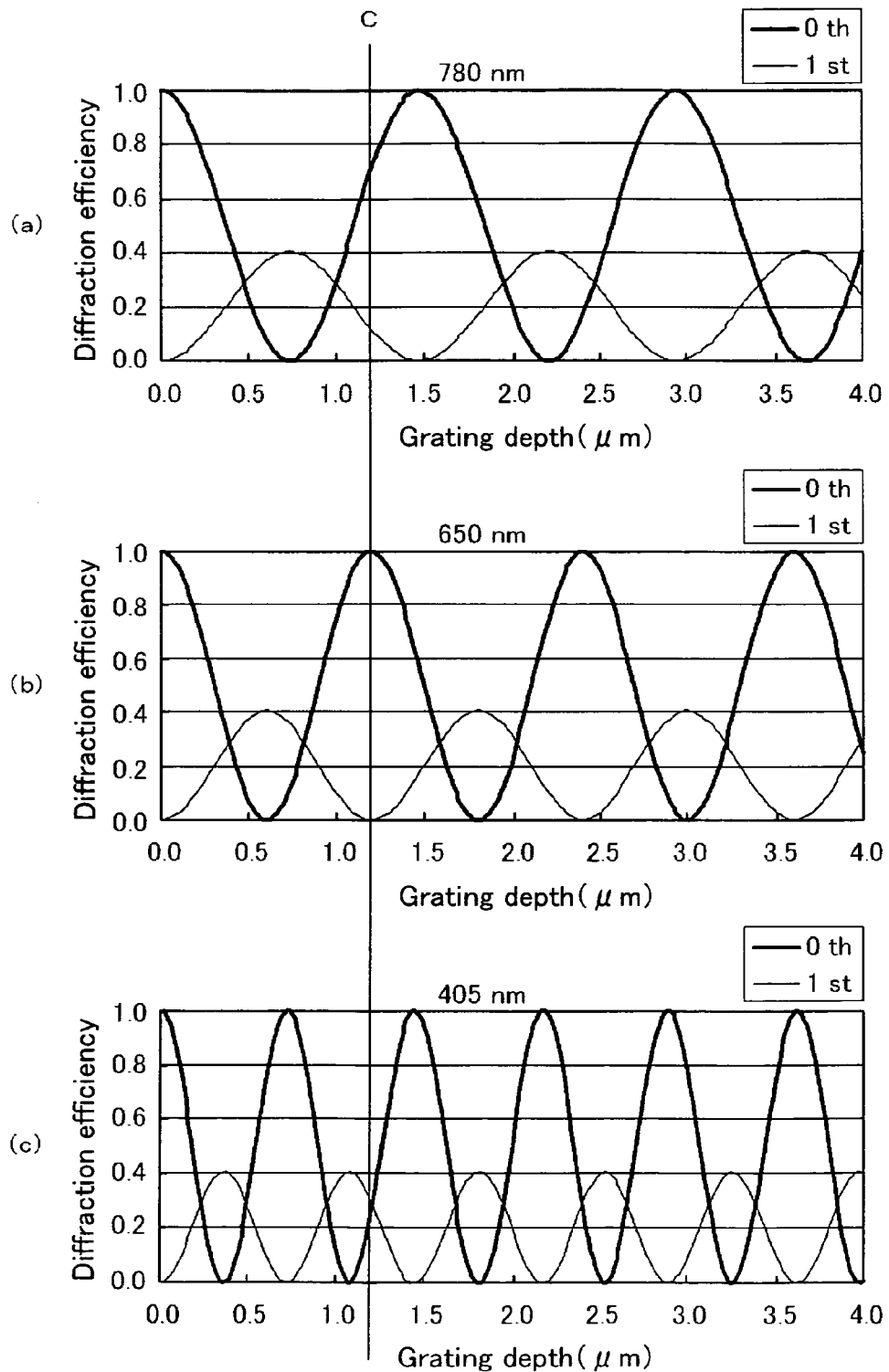
FIG. 4 is a set of graph charts illustrating diffraction efficiencies of each of zeroth order and first order diffraction light beams, in a diffractive optical element having a duty cycle of 0.5.

A general optical characteristics of the diffractive optical element will be described below. FIG. 4 is a set of graph charts illustrating respective diffraction efficiencies of zeroth order diffraction light beams, i.e., transmitted light beams (zeroth order ones as shown) and first order diffraction light beams (first order ones as shown), of the diffractive optical element at a duty cycle of 0.5; FIGS. 4(a) through 4(c) illustrate situations where wavelengths are 780 nm, 650 nm, and 405 nm, respectively. Here, graph calculations use 1.55 as a refractive index of the diffractive optical element 5.

Figure 5:
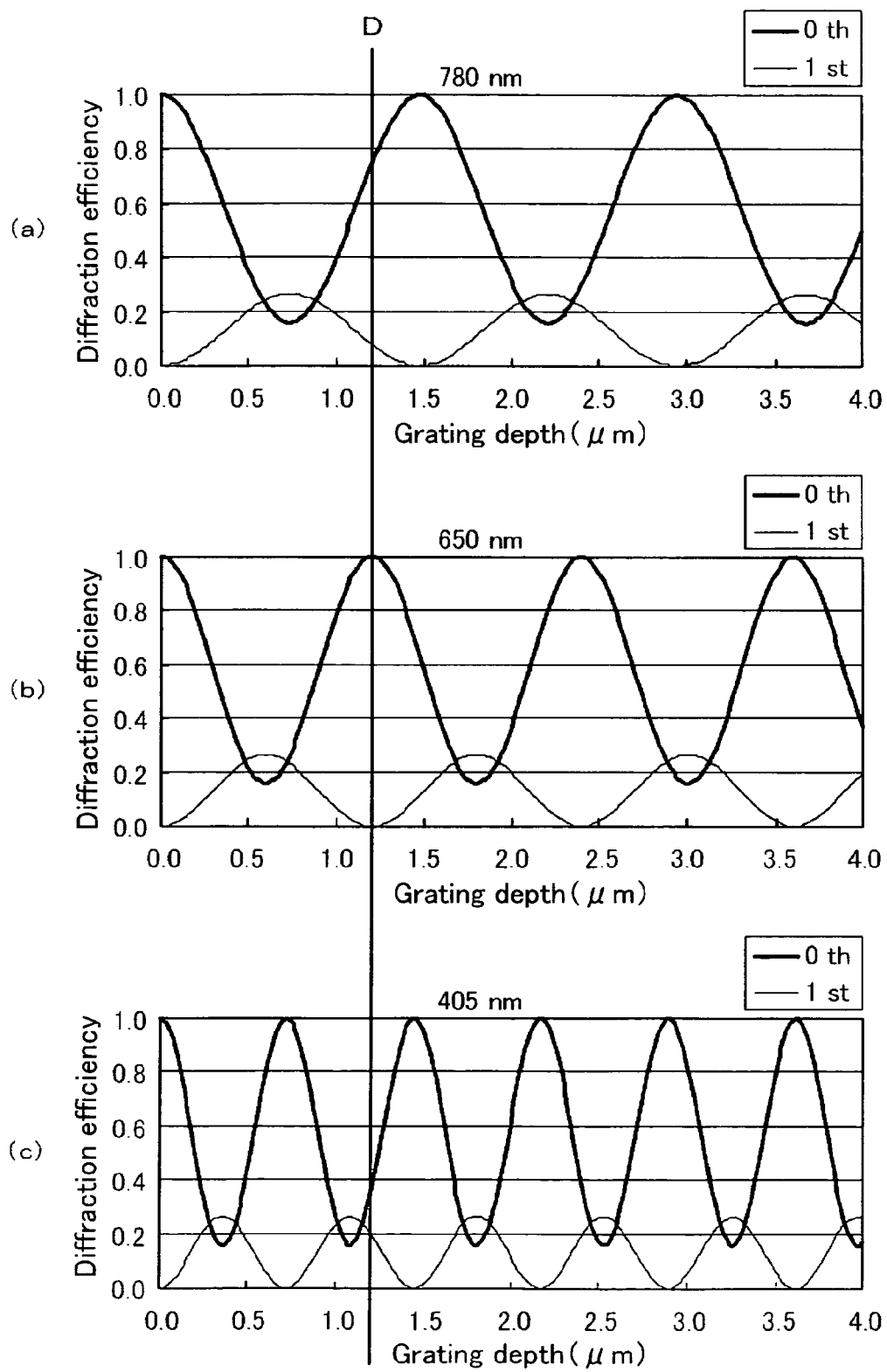
FIG. 5 is a set of graph charts illustrating diffraction efficiencies of each of zeroth order and first order diffraction light beams, in a diffractive optical element having a duty cycle of 0.3.
Figure 6:
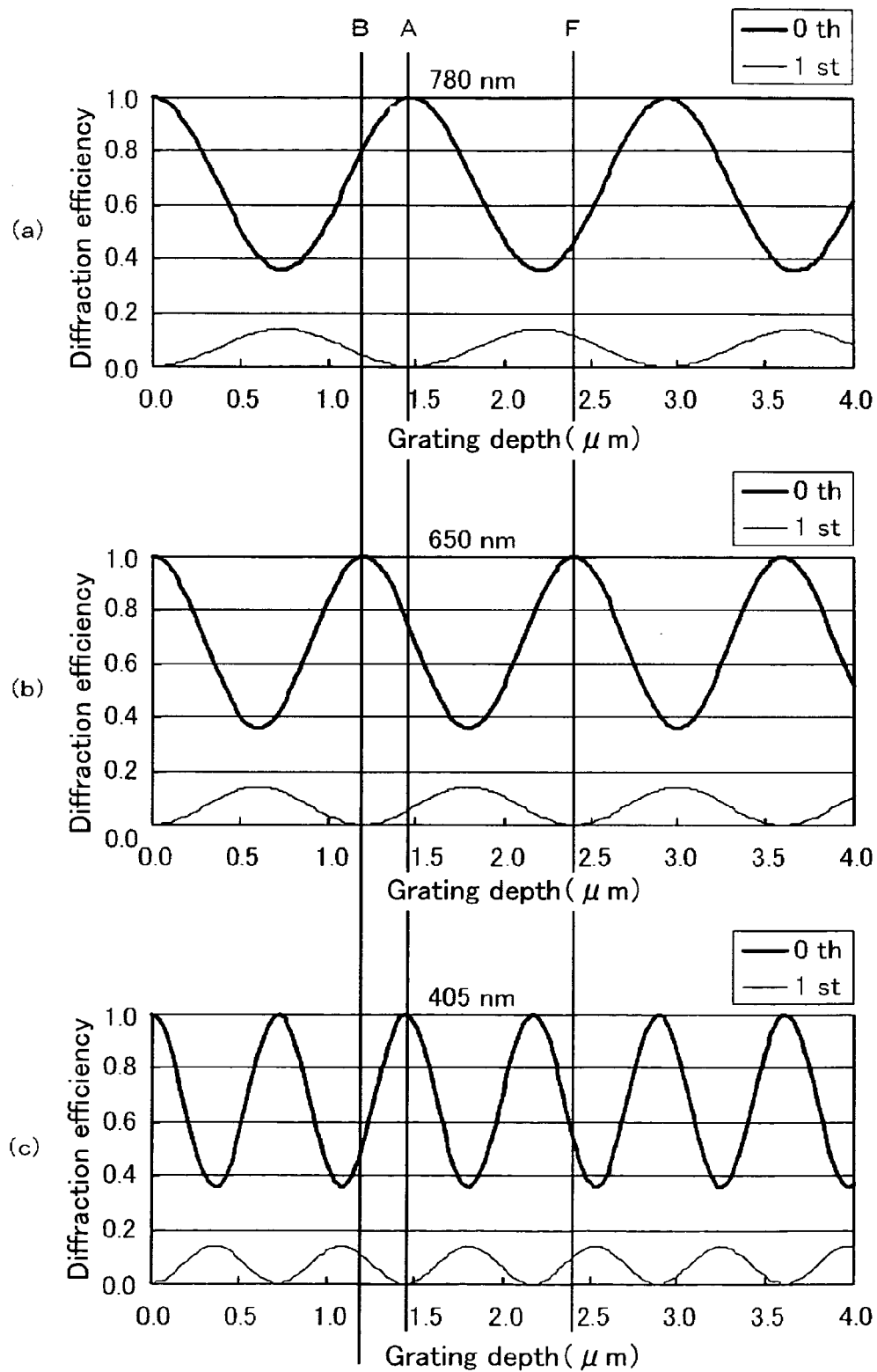
FIG. 6 is a set of graph charts illustrating diffraction efficiencies of each of zeroth and first diffraction light beams, in a diffractive optical element having a duty cycle of 0.2.
Figure 7:
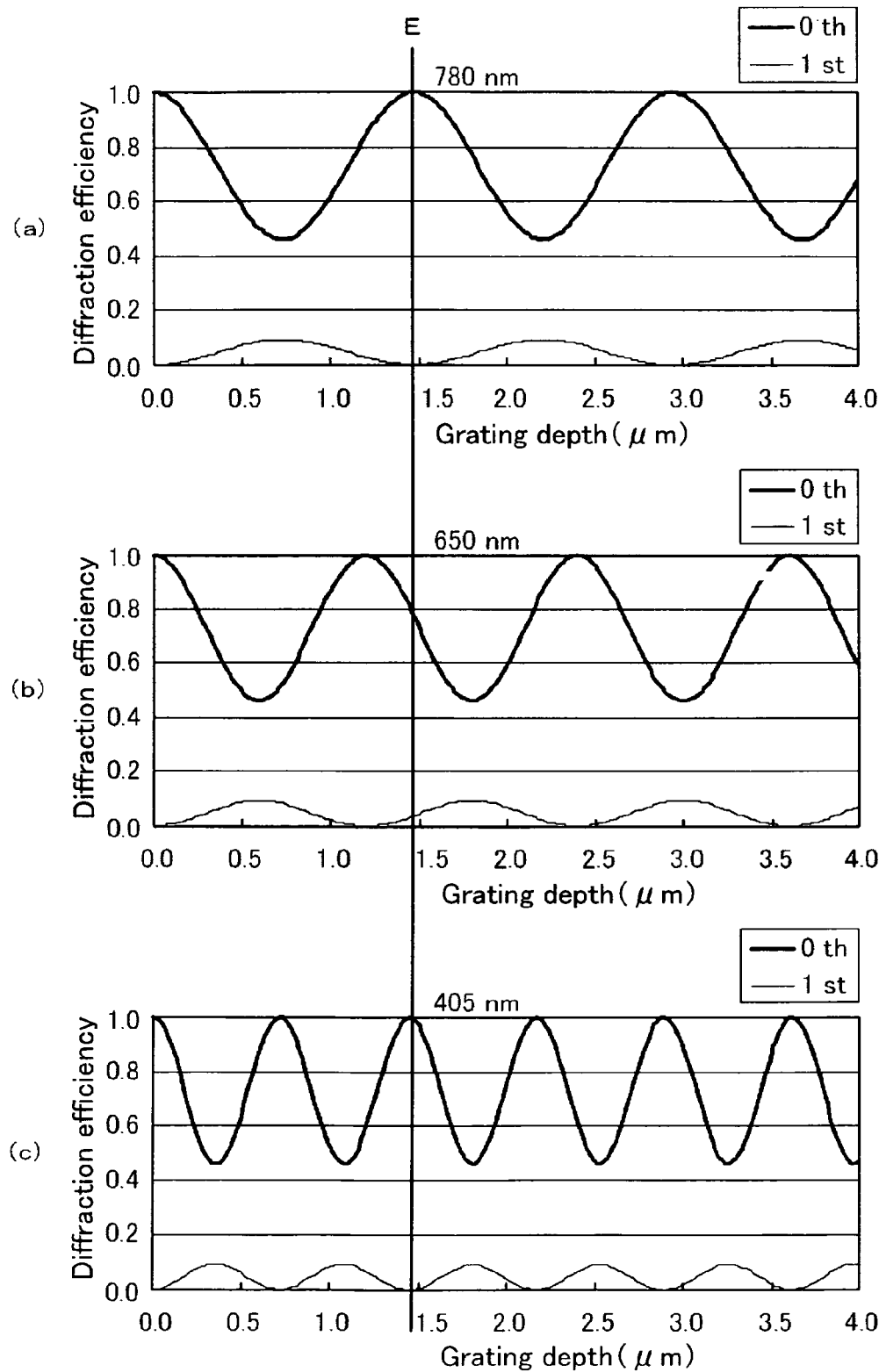
FIG. 7 is a set of graph charts illustrating diffraction efficiencies of each of zeroth and first diffraction light beams, in a diffractive optical element having a duty cycle of 0.16.

FIG. 5 is a set of graph charts illustrating respective diffraction efficiencies of the zeroth order and the first order diffraction light beams of the diffractive optical element at a duty cycle of 0.3. FIG. 6 is a set of graph charts illustrating respective diffraction efficiencies of the zeroth order and first order diffraction light beams of the diffractive optical element at a duty cycle of 0.2. FIG. 7 is a set of graph charts illustrating respective diffraction efficiencies of the zeroth order and first order diffraction light beams of the diffractive optical element at a duty cycle of 0.16. Note that conditions—wavelengths and refractive indexes—in FIGS. 5 through 7 are the same as those in FIG. 4.

The zeroth and first order diffraction light beams vary depending on the diffraction grating depth; here, a feature characteristic is that generally, if the wavelength is given as $\lambda$ and refractive index of the diffractive optical element 5 as N, then the zeroth order diffraction efficiency becomes maximum at the diffraction grating depth of even multiples of $\lambda/2/(N-1)$ and minimum at the diffraction grating depth of odd multiples of $\lambda/2/(N-1)$. Conversely, the first order diffraction efficiency becomes minimum at the diffraction grating depth of even multiples of $\lambda/2/(N-1)$ and maximum at the diffraction grating depth of odd multiples of $\lambda/2/(N-1)$. Furthermore, the minimum value of the zeroth order diffraction efficiency and the maximum value of the first order diffraction efficiency are dependent on the duty cycle.

Figure 8:
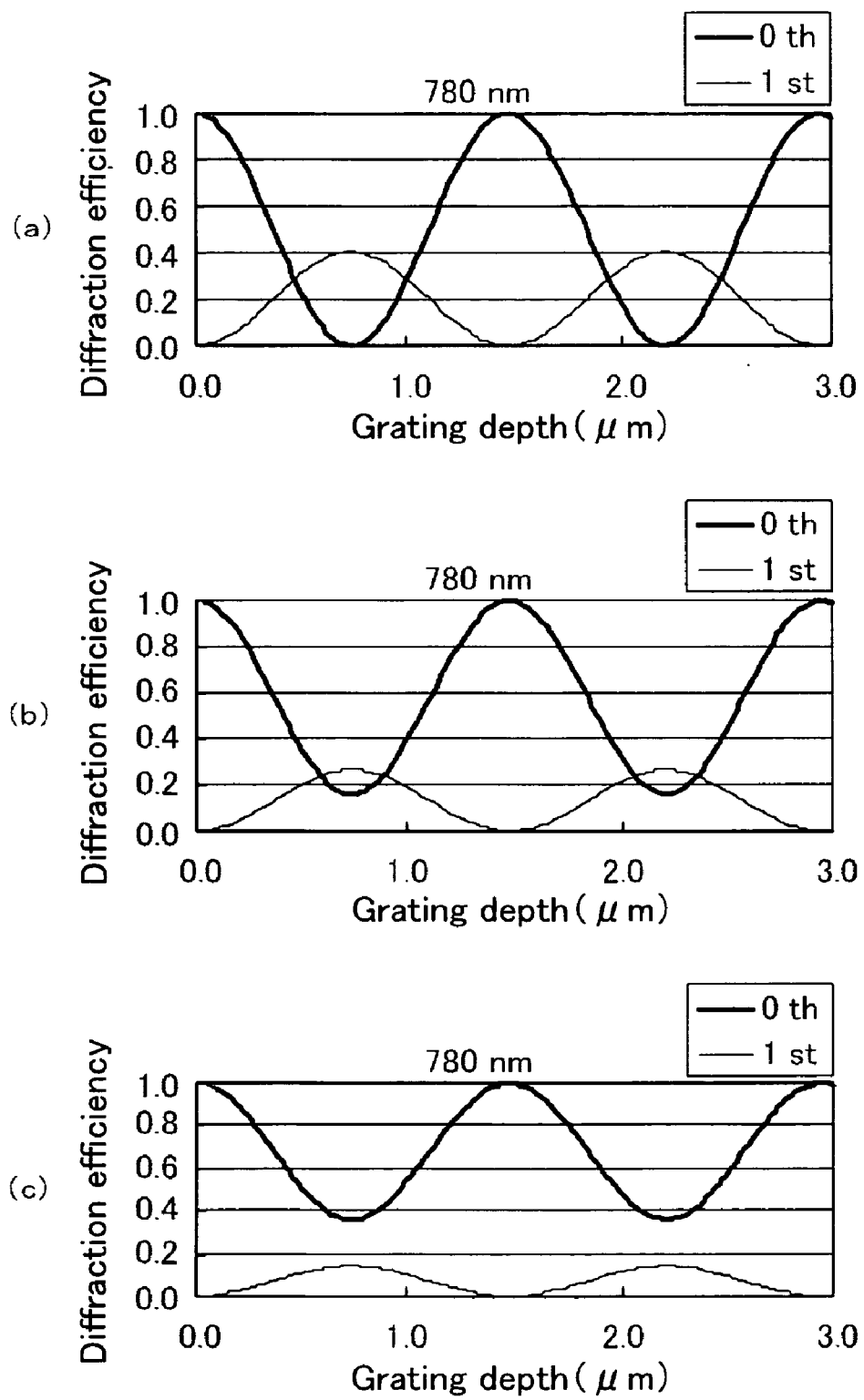
FIG. 8 is a set of graph charts showing dependency on the duty cycle, of the minimum value of a zeroth order diffraction efficiency and the maximum value of a first order diffraction efficiency.
Figure 9:
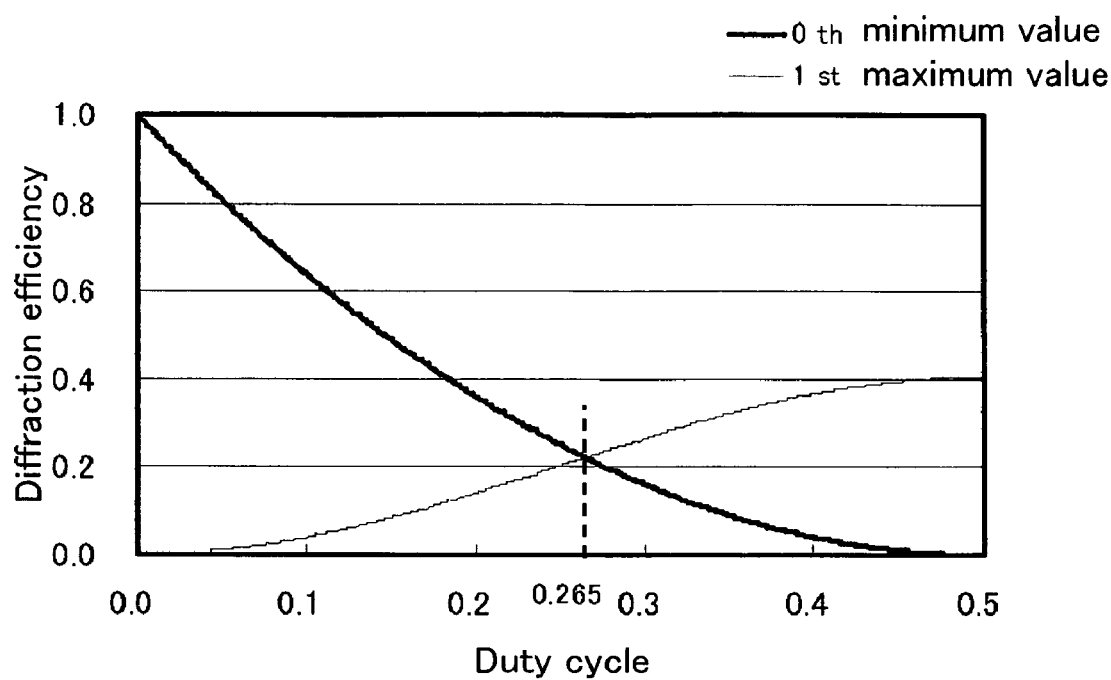
FIG. 9 is a graph chart illustrating variations in the minimum value of the zeroth order diffraction efficiency and the maximum value of the first order diffraction efficiency, plotted against the duty cycles.

FIG. 8 is a set of graph charts showing dependency on the duty cycle, of the minimum value of the zeroth order diffraction efficiency and the maximum value of the first order diffraction efficiency, and indicates situations where the wavelength is 780 nm, as an example; Note that a tendency in situations where the wavelength is 780 nm, as will be discussed later, appears similarly in other wavelengths as well. FIGS. 8(a) through 8(c) illustrates situations where duty cycles are 0.5, 0.3 and 0.2, respectively. The minimum value of the zeroth order diffraction efficiency becomes minimum at the duty cycle of 0.5, and greater as the duty cycle becomes smaller. In contrast, the maximum value of the first order diffraction efficiency becomes maximum at the duty cycle of 0.5, and smaller as the duty cycle becomes smaller. FIG. 9 is a graph chart illustrating variations in the minimum value of the zeroth order diffraction efficiency and the maximum value of the first order diffraction efficiency, plotted against the duty cycles; the duty cycle in situations where the minimum value of the zeroth order diffraction efficiency is equal to the maximum value of the first order diffraction efficiency, is approximately 0.27, below 0.3; in a more detail, it is approximately 0.265.

Next, with reference to FIG. 3, operation on the optical diffraction element 5 will be described below. The first diffraction grating 6 as indicated by, for example, A portion straight line has a duty cycle of D1=0.2, and is formed with a grating depth of approximately 1.5 micrometers. Thus, when three different wavelength laser beams from the semiconductor laser 1 enter the first diffraction grating 6, the first order diffraction beam is generated at the second wavelength of 650 nm, as shown by the characteristics at the points of intersection with the straight line A in FIG. 6; when beams of the first wavelength of 780 nm and the third wavelength of 405 nm enter, there is generated no first order diffraction beam, with the incident light beams passing through as they are. In contrast, the second diffraction grating 7 as indicated by, for example, B portion straight line has a duty cycle of D2=0.2, and is formed with a grating depth of approximately 1.2 micrometers. Thus, when three different wavelength laser beams from the semiconductor laser 1 enter the second diffraction grating 7, the first order diffraction beams are generated at the first wavelength of 780 nm and the third wavelength of 405 nm, as shown by the characteristics at the points of intersection with the straight line B; at the second wavelength of 650 nm, no first order diffraction beam is generated, with the incident light beam, as it is, passing through the grating.

From the forgoing description, the first order diffraction beam for tracking control can be obtained with respect to only the second laser beam 3 in the first diffraction grating 6. Furthermore, in the second diffraction grating 7, the first order diffraction beam for tracking control can be obtained with respect to two wavelength laser beams, the first wavelength laser beam 2 and third wavelength laser beam 4. Thus, with respect to the three wavelengths, the two diffraction gratings with desirable characteristics can be obtained.

In the foregoing description, the duty cycle has been 0.2; when, for example, the duty cycle of the second diffraction grating 7 is set to D2=0.5, the zeroth and first diffraction efficiencies at the third wavelength 405 nm are substantially equal to each other, as is apparent at the points of intersection with the straight line C in FIG. 4. Generally, the zeroth order diffraction beam is used for recording data on or reading data from the optical disc; it is, thus, preferable that the diffraction efficiency be as large as possible. In contrast, since the first order diffraction beam is used exclusively for the tracking control, it is more preferable that the first order diffraction efficiency be smaller than the zeroth one. One of the reasons is that an economical use of semiconductor lasers is to provide to the zeroth order diffraction light beam a maximum amount of laser output power generated from the semiconductor lasers, thus ensuring intensity of the laser beam needed for the optical disc. Furthermore, another reason is that a thermal damage to the optical disc needs to be considered; that is, while data is being recorded onto the optical disc, the laser output power is pulsingly increased; in conjunction with this action, the laser intensity of the first order diffraction beam increases, as well as that of the zeroth order diffraction beam. When the laser intensity of the first order diffraction beam is excessively large, situations could occur where data is recorded onto the optical disc by the first order diffraction beam as well, and the optical disc is damaged thermally. The first order diffraction beam is employed for tracking control; it is preferable that the laser intensity of the first order diffraction beam is reduced to a small amount so that the optical disc is not thermally damaged even during recording time when the laser intensity increases. As a consequence, generally, the first order diffraction efficiency is set to the degree of ¼ to ¹⁄₂₀, furthermore, of ⅕ to ¹⁄₂₀, of the zeroth order diffraction efficiency.

Thus, the fact that the zeroth order diffraction efficiency is substantially equal to the first order diffraction efficiency poses a problem in that the zeroth order diffraction beam intensity enough to record data on or read data from the optical disc is not ensured, and another problem in that data is recorded on the optical disc using the first order diffraction beam, or the optical disc is damaged thermally; hence, it is not preferable in designing the diffractive optical element that the duty cycle be set to D2=0.5. Similarly, if the duty cycle of the second diffraction grating 7 is assigned as D2=0.3, then, the value of the zeroth order diffraction efficiency is close to that of the first order one, as is apparent at the points of intersection with the straight line D in FIG. 5.

As is apparent from the forgoing description, in order to change the zeroth and first order diffraction efficiencies into a more desirable state, magnitude relationship between the minimum value of the zeroth order one and the maximum value of the first order one is important. The magnitude relationship depends upon the diffraction grating depth, which is apparent from the graph charts in FIGS. 4 through 7; as is apparent from FIG. 8 as well, preferably, the duty cycle is set to 0.3 or less in order to make the zeroth one larger than the first one. Furthermore, more preferably, the duty cycle is approximately 0.27 or less. Further, most preferably, the duty cycle is approximately 0.265 or less. That is, assigning the duty cycle as 0.265 or less, as shown in FIG. 9 can make the zeroth order one larger than the first order one, regardless of the diffraction grating depth.

Configuring the diffractive optical element 5, as described above, can achieve at two diffraction gratings the respective desirable diffraction efficiencies with respect to three wavelength laser beams propagating along the substantially identical path. In the optical head, this arrangement enables the tracking control to be performed in a simple optical system configuration and, moreover, using the first order diffraction beam.

In the first diffraction grating 6 according to Embodiment 1, the duty cycle has been set to D1=0.2; at the second wavelength 650 nm, the duty cycle D1 may be varied so that the zeroth and first order diffraction efficiencies are desirable values. If the duty cycle is set to D1=0.16, for instance, then it corresponds to points of intersection with the straight line E in FIG. 7; characteristics can be varied in such a direction that the zeroth order diffraction efficiency is increased and the first order one is decreased.

Furthermore, the diffraction grating depth, which is made approximately 1.2 micrometers in the second diffraction grating 6 according to Embodiment 1, may be made approximately 2.4 micrometers as is indicated at the points of intersection with the straight line F in FIG. 6. In this case, compared with points of intersection with the straight line B, the magnitudes of the zeroth and first diffraction efficiencies at the first wavelength of 780 nm and at the third wavelength of 405 nm differ from each other; thus, the diffraction grating depth may be selected so as to be advantageous to performance of an optical head and/or an optical disc drive.

In addition, the diffractive optical element according to Embodiment 1 diffracts the laser beam 3 of the second wavelength 650 nm on the first diffraction grating thereof, and concurrently diffracts on the second diffraction grating thereof the laser beam 2 of the first wavelength 780 nm and the laser beam 4 of the third wavelength 405 nm. This is because there exists a preferable relationship in which because the first wavelength is approximately two times the third wavelength, the zeroth order diffraction efficiency at the third wavelength exhibits its maximum at all times in the diffraction grating depth where the zeroth order diffraction efficiency also becomes its maximum at the first wavelength.

However, even if there is not present the forgoing double-relationship, the zeroth order diffraction has its maximum at the grating depth of even multiples of $\lambda/2/(N-1)$; thus, in general, in the diffraction grating depth obtained from the relational expression $\lambda/2/(N-1)$ by using the LCM (least common multiple) of two different arbitrary wavelengths, conditions can apparently be obtained such that neither of the two wavelengths are diffracted concurrently.

Figure 10:
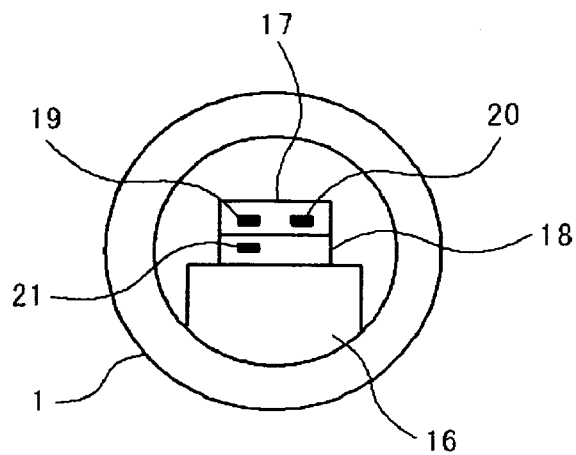
FIG. 10 is another schematic elevation view of a semiconductor laser 1 in another configuration according to Embodiment 1 of the present invention, as viewed from the light emission direction.

Furthermore, the semiconductor laser 1 according to Embodiment 1, in which three laser-beam-generating regions 19, 20 and 21 are arranged in a parallel row on the heat dissipation member 16, may be arranged as shown in FIG. 10. FIG. 10 is another schematic elevation view of a semiconductor laser in another configuration different from that in FIG. 2, as viewed from the light emission direction; i.e., the configuration is that the first and second semiconductor laser elements 17 and 18 are overlaid with one on another on the heat dissipation member 16. Here, the first semiconductor laser element 17 is configured to have two regions to generate laser energy; however, the region arrangement is not limited to this one.

Furthermore, the diffractive optical element 5 according to Embodiment 1 diffracts the laser beam of a single wavelength on the diffraction grating where the laser beam enters from the semiconductor laser 1, and the laser beams of two different wavelengths on the diffraction grating from which the laser beam emits. However, the two different wavelength laser beams may be diffracted on the diffraction grating where the laser beams are incident and the laser beam of a single wavelength may be diffracted on the diffraction grating from which the laser beam emits.

The invention claimed is:

1. A diffractive optical element comprising:
a first diffraction grating; and
a second diffraction grating that is located opposite the first diffraction grating;
wherein a grating depth of the first diffraction grating is defined so that, with respect to three different wavelength incident light beams, on the first diffraction grating, a diffraction efficiency in one wavelength first order diffraction light beam is approximately zero;
wherein the grating depth of the second diffraction grating is defined so that diffraction efficiencies of the first order diffraction light beams of the other two different wavelengths are approximately zeros;
wherein a first light beam wavelength of the other two different light beams is approximately two times a second one, and the two of the three different wavelength incident light beams are the longest wavelength beam and the shortest wavelength beam;
wherein a refractive index of a space of the first grooved portion is substantially equal to that of the second grooved portion; and a refractive index of a first ungrooved portion having a width obtained when the first grooved portion width is subtracted from a pitch of the first diffraction grating is substantially equal to that of a second ungrooved portion having a width obtained when the second grooved portion width is subtracted from a pitch of the second diffraction grating; and
wherein a ratio of the first grooved portion width to the first grating pitch and a ratio of the second grooved portion width to the second grating pitch, are set to respective predetermined values.

2. The diffractive optical element of claim 1, wherein the predetermined values are 0.3 or less.

3. The diffractive optical element of claim 1, wherein the predetermined values are 0.27 or less.

4. The diffractive optical element of claim 1, wherein with respect to one wavelength light beam incident on the second diffraction grating, the diffraction efficiency of the first order diffraction light beam is approximately ¼ to approximately 1/20 of that of a zeroth order diffraction light beam, and with respect to the other two different light beams incident on the first diffraction grating, the diffraction efficiencies of the first order diffraction light beams are approximately ¼ to approximately 1/20 of those of the zeroth order diffraction light beams.

5. The diffractive optical element of claim 1, wherein in one wavelength light beam incident on the second diffraction grating, the diffraction efficiency of the first order diffraction light beam is approximately ⅕ to approximately 1/20 of that of the zeroth order diffraction light beam, and in the other two different light beams incident on the first diffraction grating, the diffraction efficiencies of the first order diffraction light beams are approximately ⅕ to approximately 1/20 of those of the zeroth order diffraction light beams.

6. An optical head comprising:
a diffractive optical element according to claim 1; and
light sources each that generates one of three different wavelength light beams;

wherein the optical head is configured in such a way that the light beams generated from the light sources are incident on the diffractive optical element.

* * * * *